United States Patent [19]

Kakegawa

[11] Patent Number: 4,813,061
[45] Date of Patent: Mar. 14, 1989

[54] X-RAY DIAGNOSIS METHOD AND APPARATUS

[75] Inventor: Makoto Kakegawa, Tokyo, Japan
[73] Assignee: Kabushiki Kaisha Toshiba, Kawasaki, Japan
[21] Appl. No.: 81,726
[22] Filed: Aug. 5, 1987
[30] Foreign Application Priority Data Aug. 5, 1986 [JP] Japan .................. 61-182654

[51] Int. Cl.$^4$ .............................. H05G 1/64
[52] U.S. Cl. ........................ 378/99; 358/111
[58] Field of Search ............ 358/111; 378/99, 98; 364/414

[56] References Cited
U.S. PATENT DOCUMENTS

| | | | |
|---|---|---|---|
| 4,144,569 | 3/1979 | Wagner | 364/414 |
| 4,387,428 | 6/1983 | Ishida et al. | 364/414 |
| 4,544,948 | 10/1985 | Okazaki | 358/111 |
| 4,559,557 | 12/1985 | Keyes et al. | 358/111 |
| 4,663,773 | 5/1987 | Haendle et al. | 378/99 |
| 4,686,695 | 8/1987 | Macouski | 378/99 X |

Primary Examiner—Eugene R. LaRoche
Assistant Examiner—Seung Ham
Attorney, Agent, or Firm—Oblon, Fisher, Spivak, McClelland & Maier

[57] ABSTRACT

X-ray pictures cooresponding to the same portion of a suject are stored in first and second imaging plates with the use of an x-ray of different energy. The stored X-ray pictures are converted to corresponding digital picture data and energy subtraction picture data is stored in memory with the use of a predetermined weight coefficient. A profile of a to-be-eliminated image of the picture stored es extracted and a remaining amount of the to-be-eliminated image is determined through comparison between the differentiated values of the profile and a threshold level.

10 Claims, 4 Drawing Sheets

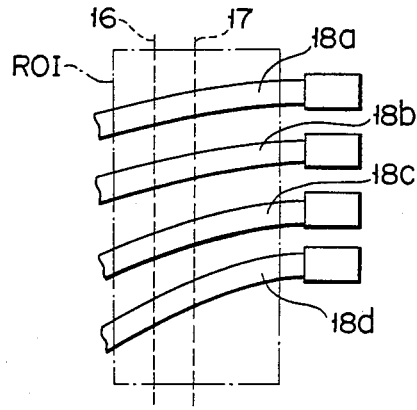
F I G. 3
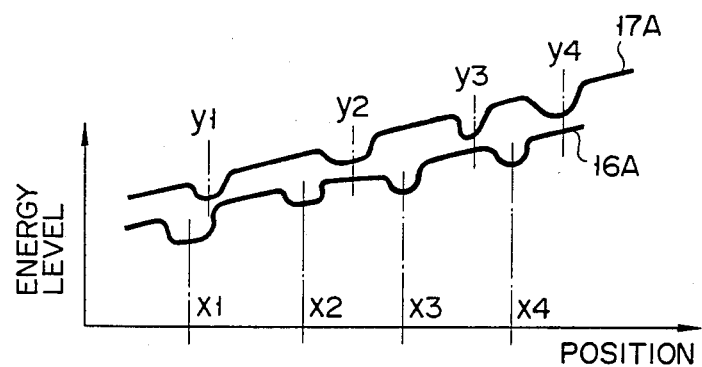
F I G. 4
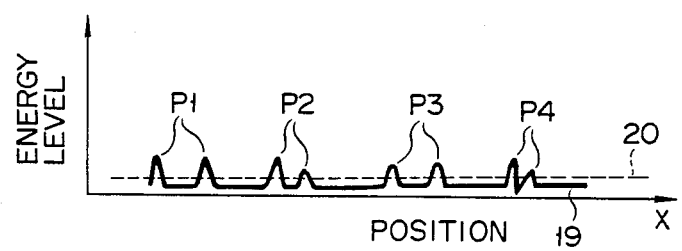
F I G. 5

X-RAY DIAGNOSIS METHOD AND APPARATUS

BACKGROUND OF THE INVENTION

1. Field of the Invention

This invention relates to an X-ray diagnosis method and apparatus for taking a plurality of X-ray penetration pictures of the same region of a subject and preparing an energy subtraction image on the basis of these pictures.

2. Discussion of the Background

A conventional digital radiographic apparatus is known which is of a type employing an imaging plate having a stimulation type phosphor. An X-ray picture which has penetrated the subject is stored as a phosphor image on the image plate each time. The stored subject picture is scanned by a scanner employing, for example, a laser beam, and, after being photoelectrically converted, obtained as an A/D converted digital picture signal. The digital picture signal, after being subjected to various image processings by virtue of a computer, is printed on a film, or displayed on a CRT display, for diagnosis.

Such a digital radiographic or a computer-assisted radiographic method is adapted to, while varying an X-ray energy with which the subject is irradiated, obtain a plurality of X-ray penetration pictures and to perform a subtractive processing on the respective pictures with a predetermined weighting on the respective X-ray penetration picture. This is referred to as an energy subtraction method. For example, a thorax X-ray picture (LP) is obtained with a relatively light X-ray provided, for example, with 85 kilovolts applied across the plate and filament of an X-ray tube. Then an X-ray image (HP) of the same region of the subject is obtained with a heavy X-ray provided with 135 kilovolts applied across the plate and the filament of the X-ray tube.

In order to prepare a soft tissue picture (SP), such as the lungs, through the elimination of a bone picture, it is only necessary to perform a calculation $$(SP) = b(LP) - (HP) \ldots \quad (1)$$

where b represents a weighting coefficient, for example, $b \approx 2$ which is a value usually employed. Needless to say, for the energy subtraction method to be executed, Equation (1) is evaluated with respect to the pixels on one imaging plate and the corresponding pixels on another imaging plate.

For an optimal target picture, such as the soft tissue picture (SP), to be obtained for diagnosis, the weighting coefficient b is set at an optimal value in the implementation of the energy subtraction method.

Conventionally, the weighting coefficient is determined through the experiences of the operator on the X-ray diagnostic apparatus. If, as a result of the operation of Equation (1), the component of the bone picture is still left in the soft tissue picture (SP), it will be necessary to change the value b of the weighting coefficient by means of a trial-and-error method. It has been difficult to determine an optimal value in the energy subtraction processing. Thus it has been impossible to rapidly obtain an energy subtraction image for better diagnosis.

SUMMARY OF THE INVENTION

It is accordingly an object of this invention to provide an X-ray diagnostic method and apparatus which can rapidly and exactly determine a weighting coefficient in the implementation of an energy subtraction processing, whereby an energy subtraction picture is quickly obtained for better diagnosis.

According to this one object of this invention an X-ray diagnostic method is provided which collects a plurality of X-ray penetration pictures relating to the same region of a subject irradiated a plurality of times with the X-ray, performs a subtraction operation between the X-ray penetration pictures with the use of a weighting coefficient, sets a region of interest of the subject on a to-be-eliminated image area of an energy subtraction picture thus obtained, determines a remaining amount of the to-be-eliminated image area on the region of the interest of the subject with the use of the subtraction operation, obtains a weighting coefficient by which the remaining amount of the aforementioned image becomes minimal, and obtains a desired energy subtraction image with the use of the weighting coefficient.

According to another object of this invention an X-ray diagnostic apparatus is provided which comprises means for obtaining a plurality of X-ray penetration pictures of the same region of a subject irradiated a plurality of times with an X-ray energy of a varying level; means for performing a subtraction operation between the plurality of X-ray penetration pictures with the use of a weighting coefficient; means for setting a region of interest (ROI) of a to-be-eliminated image onto an energy subtraction picture obtained; means for determining a remaining amount of aforementioned image on the ROI of the subject from a result of the subtraction operation; means for obtaining a weighting coefficient by which the aforementioned remaining amount becomes minimal; and means for preparing an energy subtraction image with the use of the weighting coefficient.

BRIEF DESCRIPTION OF THE DRAWINGS

FIG. 3 shows one model of a thorax X-ray penetration picture of a subject;

FIG. 4 is a plot showing the energy strength of a rib picture in FIG. 3 against each region of interest of a subject;

FIG. 5 is a plot showing the contents of an edge-enhancement filter processing and threshold level processing on the aforementioned embodiment.

DETAILED DESCRIPTION OF THE PREFERRED EMBODIMENT

The embodiment of this invention will be explained below in more detail with reference to the accompanying drawings. First, a general arrangement according to the embodiment of this invention will be explained with reference to this invention.

Figure 1:
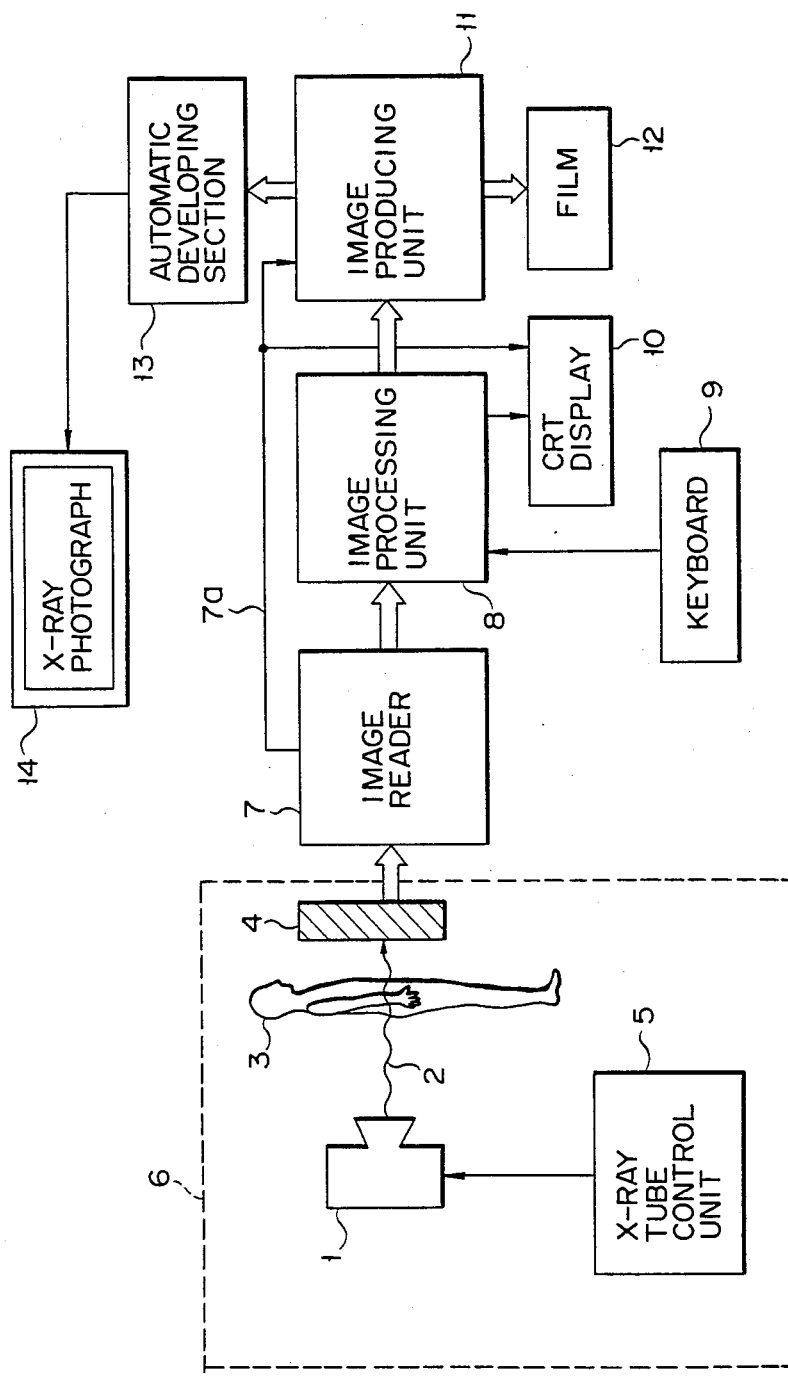
FIG. 1 is a block diagram generally showing an X-ray diagnostic apparatus according to an embodiment of this invention.

In the embodiment shown in FIG. 1, X-ray 2 from X-ray tube 1 penetrates a subject, such as human subject 3, and reaches imaging plate 4. The energy intensity of X-ray 2 is varied by varying a tube voltage, by X-ray tube control unit 5, which is applied across the plate and the filament of X-ray tube 1. As imaging plate 4 use is made of a plate of 1 mm-thick, for example, obtained by coating a stimulation type phosphor, such as BaFx:Eu (x represents a halogen), on a polyester support. This is known as a phosphor which can effectively produce a blue fluorescence, in proportion to a stored X-ray energy, by a 633 nm-wavelength laser beam from a He-Ne laser device. An arrangement from the X-ray tube control unit to imaging plate 4 as indicated by a broken line is included in X-ray imaging section 6.

The X-ray penetration picture of subject 3 which is stored on imaging plate 4 is read out, by image reader 7, for conversion to a digital picture signal. The 633 nm-wavelength laser beam from the He-Ne laser device scans the imaging plate by a scanner employing a mirror, and a blue fluorescence of an X-ray penetration picture corresponding to the stored X-ray energy is obtained from the imaging plate in response to the laser beam received. The blue fluorescence sequentially enters a photomultiplier tube where it is photoelectrically converted to obtain an analog signal corresponding to an X-ray penetration picture. The analog signal is converted by an A/D converter to a digital signal, which in turn is delivered to image reader 7 and thence to image processing unit 8.

Image processing unit 8 is comprised of a digital processing unit, such as a microcomputer, which performs an image processing with the use of that digital signal to obtain an energy subtraction picture. External input device 9, such as a keyboard, and CRT display 10 are connected to microcomputer 8. Keyboard 9 is used to set a region of interest (ROI) of the subject on a picture, which is to be eliminated. In doing so, a keyboard associated with a track ball, for example, is used for setting. A detailed explanation of it will be explained below.

Energy subtraction picture data obtained at image processing unit 8 is sent to image producing section 11 where it is converted to an analog signal so that it can be printed on film 12 with the use of, for example, a laser printer. Alternatively, film 12 thus printed is developed by automatic developing unit 13 to obtain X-ray photograph 14 for diagnosis.

The function of image processor, the microcomputer in this case, comprised of image processing unit 8 will be explained below with reference to FIGS. 2 to 6.

Figure 2:
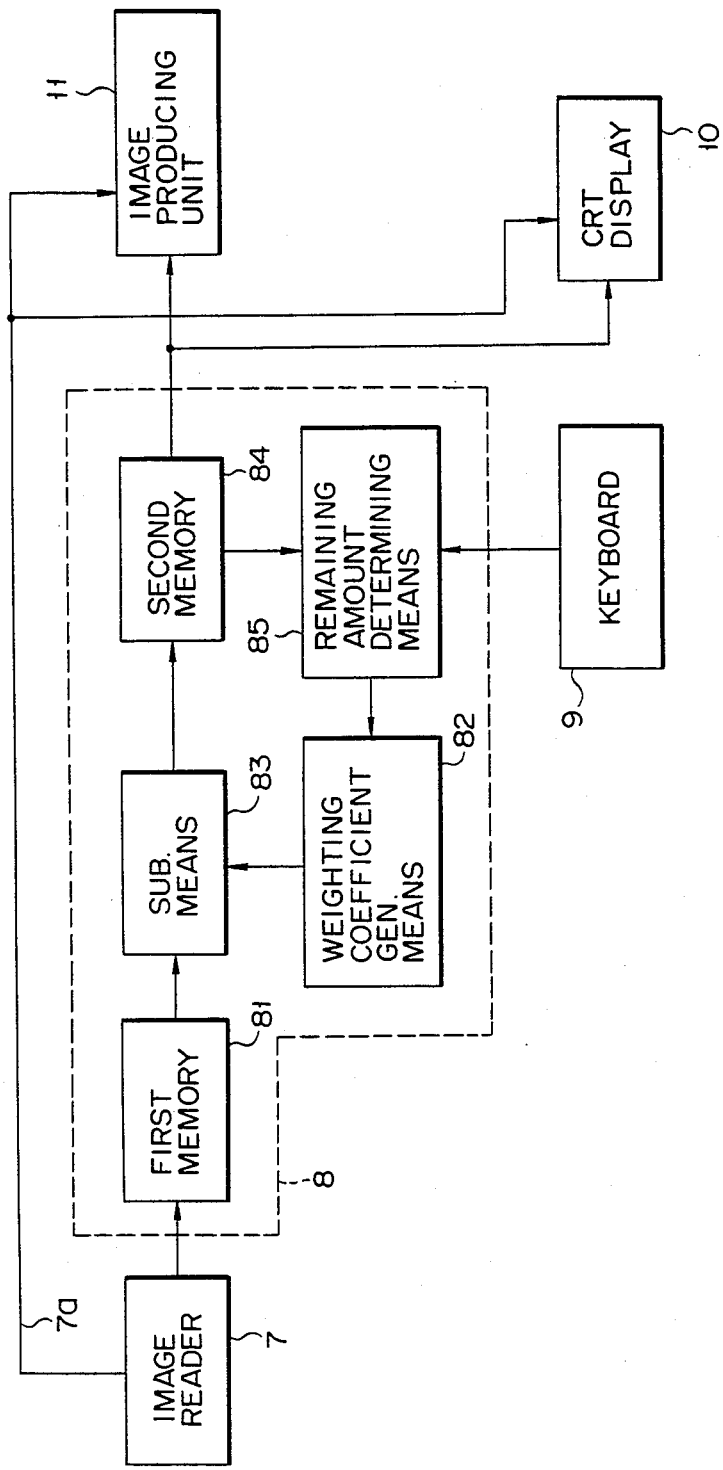
FIG. 2 is a circuit arrangement showing, in detail, the function of an image processing section of FIG. 1.

In a circuit shown in FIG. 2, the digital picture data from image processing unit 7 is stored in first data memory 81 using a RAM of the microcomputer. The data storage position of data memory 81 is set on imaging plate 4 in a manner to correspond to the respective pixel. When an X-ray penetration picture on one imaging plate 4 is stored in memory 81, the data of an X-ray penetration picture on another imaging plate (not shown) is supplied to microcomputer 8 for each pixel, noting that the another X-ray penetration picture is obtained using an X-ray of a different energy. At this time, the pixel data which has already been stored in first memory 81 is read out under control of a CPU in microcomputer 8 to provide difference data relative to pixel data now obtained At this time, in order to obtain a soft tissue picture (SP) with the use of Equation (1), a weighting function b is read out of weighting coefficient generating means 82, for example, a ROM and then supplied to subtraction means 83 where the calculation of Equation (1) is carried out. As a result of subtraction, the pixel data of an energy subtraction soft tissue image (SP) is stored in second data memory 84 under control of CPU. Second data memory 84 may be another RAM as distinct from first memory 81 or may be a single two-part RAM.

The energy subtraction picture data stored in second memory 84 is read out under control of CPU and determination is made by remaining amount determining means 85 as to whether or not the energy intensity of ROI set on keyboard 9 is greater or smaller than a remaining amount determining reference level $\Sigma Pi^2$ (described later). Where the remaining amount is determined to be greater, the weighting coefficient of a greater value is read out of ROM 82 in accordance with the remaining amount data. In this way, the energy subtraction picture data is stored in second memory 84 in such a manner that an eventually unrequired remaining picture within the ROI becomes minimal.

The operation of the embodiment of FIGS. 1 and 2 will be explained below in more detail.

Figure 6:
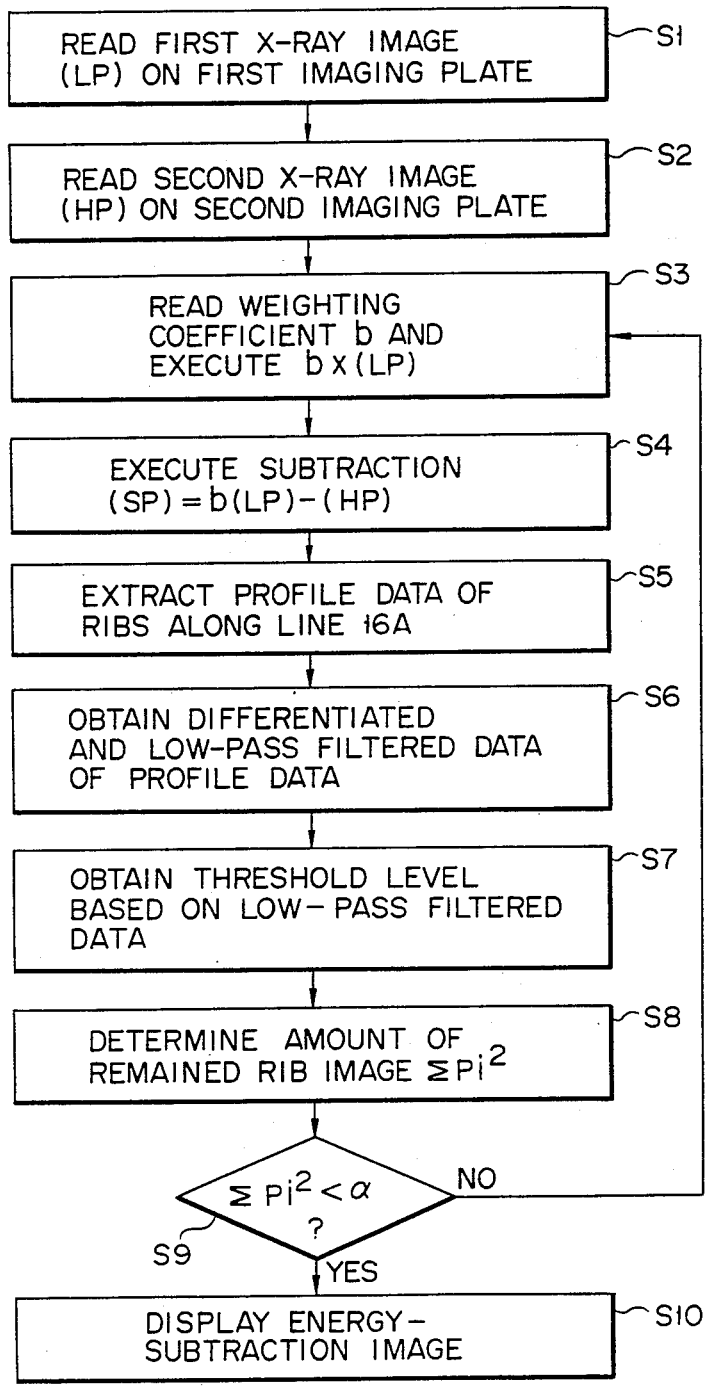
FIG. 6 shows a flowchart for explaining the operation of the embodiment of this invention.

First, an X-ray penetration picture is formed on one image plate 4 when an output tube voltage in X-ray tube control unit 5 is 85 kilovolts. Then an X-ray penetration picture covering the same ROI of the subject is stored in another imaging plate (not shown) with the output tube voltage of unit 5 set to 135 kilovolts. Said another imaging plate with the X-ray penetration picture stored therein is taken out of X-ray imaging section 6 and placed on image reader 7. Reference is invited to FIG. 6. At step S1, read-out X-ray penetration picture is converted to digital picture data and stored in first memory 81 of image processing unit 8 and supplied via line 7a to CRT display 10 and to image producing unit 11. Thus, the X-ray penetration picture to be subjected to energy subtraction processing is displayed on CRT display 10. The ROI is set, through keyboard 9, on the display screen at a picture area to be subtracted through a subtractive process.

Explanation will be given of the process of obtaining a soft tissue picture (SP) through the elimination of a rib (bone) picture (BP) by the aforementioned energy subtraction step when the thorax of the subject to be photographed. A picture covering rib images 18a to 18d is set, by a cursor key operation on keyboard 9, on CRT display 10 at the X-ray penetration picture (see FIG. 3) prior to the energy subtractive step. When this is done, then the energy subtraction process is performed.

In order to obtain the soft tissue picture (SP), it is only necessary to perform a calculation process of Equation (1). First, a lower energy X-ray penetration picture (LP) is read out at step S1(see FIG. 6) with the voltage of X-ray tube 1 set to 85 kilovolts and stored in first memory 81 and then is led onto subtraction means 83. Then at step S2 (FIG. 6) an X-ray penetration picture (HP) of higher energy obtained with a voltage of X-ray tube 1 set to 135 kilovolts is produced from image reader 7. At step S3 (FIG. 6), the first data (LP) of subtraction means (83) is multiplied by a coefficient b=2, which is initially generated from weighting coefficient generating means 82, to evaluate a value b(LP) for each pixel.

As a result, at step S4 the calculation of Equation (1)

$$(SP) = b(LP) - (HP)$$

is performed in CPU for every pixel and the result of subtraction is stored in second memory 84 and supplied by CPU to remaining amount determining means 85.

For remaining amount determination is performed as follows: With respect to the energy subtraction picture stored in second memory 84, a profile data of rib images 18a to 18d cut along two lines 16 and 17 across the respective rib images 18a to 18d in FIG. 3 is evaluated at step S5. The aforementioned profile data is obtained along lines 16A and 17A in FIG. 4 where the abscissa denotes the position of the ribs in ROI and the ordinate denotes the X-ray energy intensity. In FIG. 4, $X_1$ to $X_4$ represent the center positions of ribs 18a to 18d along line 16 and $Y_1$ to $Y_4$ the center positions of ribs 18a to 18d along line 17.

The edges of the rib images are enhanced with profile line 16A filter-treated for edge enhancement. Stated in more detail, the signal wavelength shown in profile line 16A is differentiated by CPU at step S6 in FIG. 6 and the differentiation output is subjected to a lowpass-filtering process to eliminate noise components. The edge-enhanced profile thus gained is obtained as indicated by the solid line 19 of FIG. 5. Here respective peaks P1 to P4 show the edges of ribs 18a to 18d and the low level portion between peaks P1 and P2, P2 and P3 and P3 and P4 show the soft tissue area.

Then at step S7 the average value of differentiated profile 19 is evaluated by CPU and a threshold level indicated by broken line 20 is obtained.

At step S8, the remaining amount of ribs 18a to 18d is determined by the magnitude of an added value of all the peak waveforms P1–P4 which exceed threshold level 20. With the aforementioned value of the respective peak waveform in excess of threshold level 20 represented by Pi, $\Sigma Pi^2$ is found as the remaining amount determination reference, provided that $Pi = P(Xi)$.

The data representing the value of $\Sigma Pi^2$ is compared at step S9 with a determination parameter $\alpha$ entered from keyboard 9. Unless $\Sigma Pi^2 < \alpha$, the process goes back to step S3 and the value $\Sigma Pi^2$ is sent to weighting coefficient generating means 82. A new weighting coefficient b corresponding to the aforementioned remaining amount is generated and delivered to subtraction means 83 to again perform steps S3–S8. If $\Sigma Pi^2 < \alpha$ at step S9, an optimal energy subtraction picture in which the bone image is minimized is displayed at step S10.

Although the aforementioned remaining amount determination reference has been explained as being obtained using the profile line 16A only, it may be obtained employing both profile lines 16A and 17A. That is, with respect to profile line 17A the differentiation, lowpass filtering and threshold level extraction steps are performed for edge enhancement and, in this way, it is possible to obtain a result of integration, $\Sigma Qi^2$.

Thereafter, the sum of the two results of integration $$\Sigma Pi^2 + \Sigma Qi^2$$

is gained as the rib picture (BP) remaining amount determination reference.

The remaining amount determination reference data thus gained is passed through a feedback loop including remaining amount determining means 85 and weighting coefficient generating means 82 and, when it becomes minimal, is fixed at that level. That is, that weighting coefficient generated with reference to the aforementioned reference is fixed as an optimal level.

The aforementioned fixed coefficient is treated as an optimal value for the coefficient b in the calculation of the energy subtraction Equation (1) relative to two X-ray penetration pictures obtained with the tube voltages of 85 and 135 kilovolts, respectively. With the use of the optimal value b, a final subtraction picture data is supplied from subtraction means 83 to second memory 84 where it is stored. At step S10, the final subtraction picture data is sent to CRT display 10 for visible display or printed by image producing unit 11 onto the film for supply to X-ray photograph section 14 through developing unit 13.

Although, in the embodiment shown in FIG. 1, the X-ray penetration picture has been explained as being produced with the use of imaging plate 4, it is provided by another method for storing an X-ray picture with the use of, for example, a screen film and obtaining an electric signal corresponding to an X-ray penetration picture either by an optical reading method or in a combination of an image intensifier with a television camera.

Although this invention has been explained in connection with one embodiment of this invention, it is not restricted to the aforementioned embodiment and a variety of changes or modifications may be made without be spirit and scope of this invention. For example, a plurality of ROI's may be set in the aforementioned way and, in addition to an evaluation parameter $\Sigma Pi^2$, $\Sigma Qi^2$ as a remaining amount determining reference, other parameters such as $\Sigma Pi$, $\Sigma Qi$ may also be employed in the embodiment of this invention. Further evaluation parameters may be employed. Although explanation has been made in connection with photographing the thorax of the subject p and eliminating the rib picture through the energy subtraction method, any other region of interest of the subject may be photographed.

What is claimed is:

1. An x-ray diagnostic method comprising the steps of:
   (a) collecting a plurality of X-ray penetration pictures of the same region of a subject irradiated a plurality of times with different X-ray energies;
   (b) performing a subtraction operation between the X-ray penetration pictures obtained with the use of a weighting coefficient;
   (c) setting a region of interest (ROI) of said subject on a to-be-eliminated image of an energy subtraction picture obtained at step (b);
   (d) determining a remaining amount of said to-be-eliminated image on the subject ROI on the basis of a result of said subtraction operation;
   (e) obtaining a weighting coefficient with which said remaining amount of said image becomes minimal; and
   (f) obtaining an energy subtraction picture with the use of said weighting coefficient thus obtained in the step (e), wherein said step (d) of determining a remaining amount includes the further steps of:
   (d1) obtaining profile data of the to-be-eliminated image;
   (d2) enhancing the obtained profile data to form edge-enhanced profile data; and
   (d3) calculating data representing portions of said edge-enhanced profile exceeding a preset threshold level for determining said weighting coefficient of step (e).

2. The X-ray diagnostic method according to claim 1, wherein at least two X-ray picture digital data of different energies are obtained, one of said at least two X-ray picture digital data is multiplied by a predetermined weighting coefficient in accordance with what diagnosis is to be effected, and a difference between the result of multiplication and the other X-ray picture digital data is evaluated to provide said energy subtraction picture data.

3. The X-ray diagnostic method according to claim 1, wherein profile data of said to-be-eliminated image of said energy subtraction picture, after having been obtained, is differentiated; and average of the differentiated data is evaluated as a threshold level; and the sum total of integrated values relating to portions of the differentiated data exceeding said threshold level is evaluated to obtain said remaining amount of said to-be-eliminated image.

4. The X-ray diagnostic method according to claim 3, wherein, with the total sum of said integrated values as $\Sigma Pi^2$, that weighting coefficient for a predetermined value $\alpha$ when $\Sigma Pi^2 < \alpha$ is regarded as an optimal value.

5. The X-ray diagnostic method according to claim 3, wherein, with the total sum of said integrated values as $\Sigma Pi$, that weighting coefficient for a predetermined value $\alpha$ when $\Sigma Pi < \alpha$ is regarded as an optimal value.

6. An X-ray diagnostic apparatus comprising:
   (a) means for obtaining a plurality of X-ray penetration pictures of the same region of a subject irradiated a plurality of times with an X-ray of different energy;
   (b) means for performing a subtraction operation between the X-ray penetration pictures with the use of a weighting coefficient;
   (c) means for setting a region of interest (ROI) of a subject on a to-be-eliminated image of an energy subtraction picture obtained;
   (d) means for determining a remaining amount of said to-be-eliminated image on said ROI from the result of said subtraction operation;
   (e) means for obtaining a weighting coefficient with which said remaining amount of said to-be-eliminated image becomes minimal; and
   (f) means for preparing an energy subtraction picture with the use of said weighting coefficient thus obtained in the means (e), wherein said means for determining a remaining amount (d) further includes:
   (d1) means for obtaining profile data of the to-be-eliminated image;
   (d2) means for enhancing the obtained profile data to form edge-enhanced profile data; and
   (d3) means for calculating data representing portions of said edge-enhanced profile exceeding a preset threshold level for determining said weighting coefficient of said means for obtaining a weighting coefficient (e).

7. The X-ray diagnostic apparatus according to claim 6, wherein said subtraction means comprises:
   a first memory for storing first X-ray picture digital data; and
   means for multiplying said first X-ray picture digital data, which is stored in said first memory, by a predetermined weighting coefficient, and for finding a difference between output data of said multiplying means and second X-ray picture digital data to obtain an energy subtraction picture data.

8. The X-ray diagnostic apparatus according to claim 7, wherein said means for determining a remaining amount comprises a second memory for storing said energy subtraction picture; means for obtaining profile data of the to-be-eliminated image of energy subtraction picture data stored in said second memory; means for differentiating said profile data; means for evaluating an average of said differentiated data as a threshold level; and means for finding the sum total of integrated values of portions of said differentiated data exceeding the threshold level to obtain said remaining amount.

9. The X-ray diagnostic apparatus according to claim 8, wherein said means (e) for obtaining a weighting coefficient with which said remaining amount of said to-be-eliminated image becomes minimal comprises means for setting a parameter $\alpha$ for determining the minimal remaining amount; means for detecting that $\Sigma Pi^2 < \alpha$ with the total sum of said integrated values as $\Sigma Pi^2$; and means for fixing, as an optimal value, the weighting coefficient which has been obtained under this condition.

10. The X-ray diagnostic apparatus according to claim 8, wherein said means (e) for obtaining a weighting coefficient with which said remaining amount of said to-be-eliminated image becomes minimal comprises means for setting a parameter $\alpha$ for determining the minimal remaining amount; means for detecting that $\Sigma Pi < \alpha$ with the total sum of said integrated values as $\Sigma Pi$; and means for fixing, as an optimal value, the weighting coefficient which has been obtained under this condition.

* * * * *